Feb. 28, 1933.  E. W. DAVIS  1,899,262
LUBRICANT SPRAYING APPARATUS
Filed Nov. 20, 1929
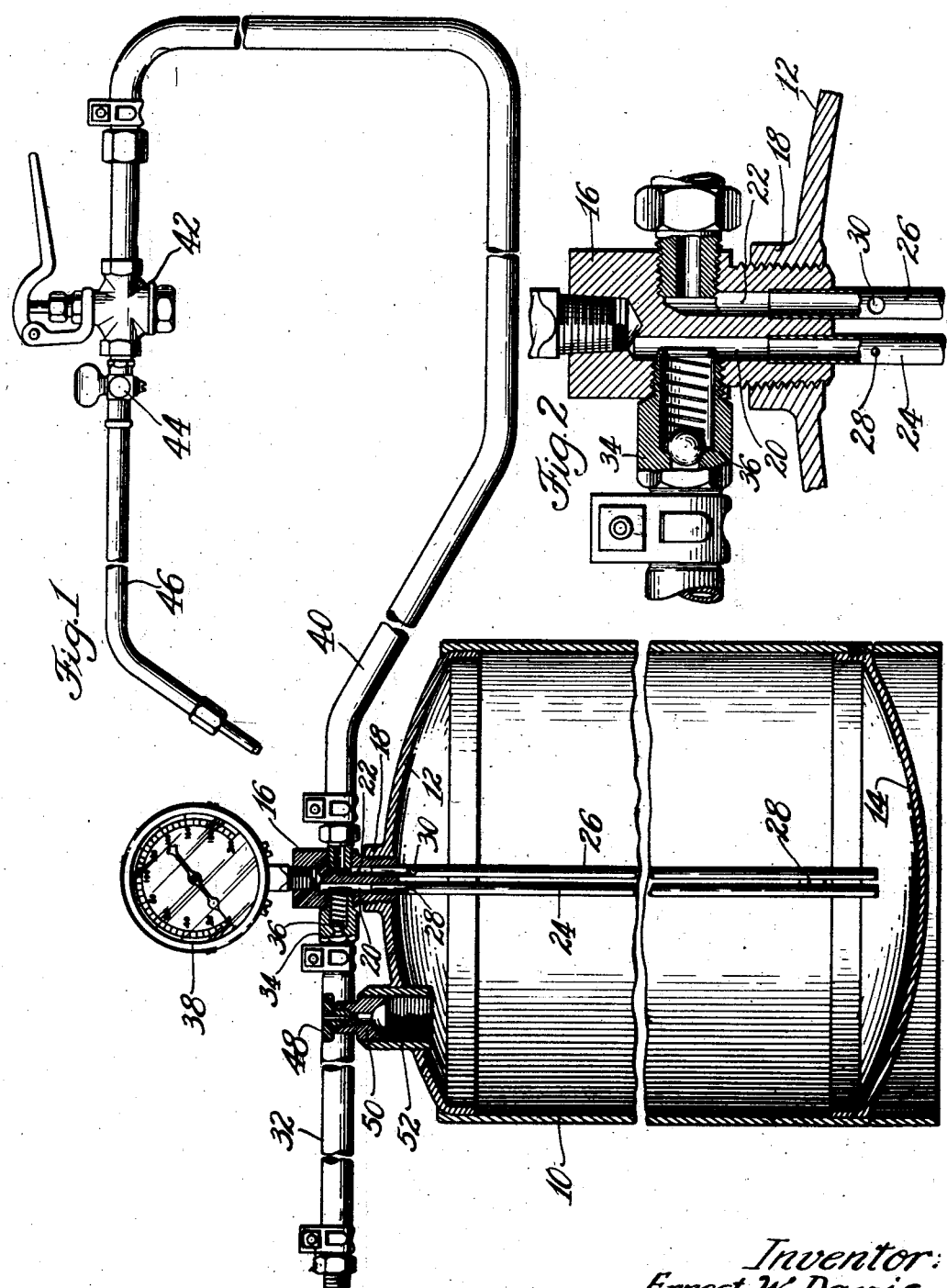
Inventor:
Ernest W. Davis
By Williams, Bradbury, McCaleb & Hinkle
Attys.

Patented Feb. 28, 1933

1,899,262

UNITED STATES PATENT OFFICE

ERNEST W. DAVIS, OF OAK PARK, ILLINOIS, ASSIGNOR TO ALEMITE CORPORATION, OF CHICAGO, ILLINOIS, A CORPORATION OF DELAWARE

LUBRICANT SPRAYING APPARATUS

Application filed November 20, 1929. Serial No. 408,557.

My invention relates generally to lubricating apparatus and more particularly to devices for spraying lubricant such as are commonly used to lubricate the leaf springs of automotive vehicles.

It is an object of my invention to provide an improved lubricant spraying apparatus in which the possibility of leakage of oil into the air supply line is eliminated.

It is a further object to provide an improved oil spraying apparatus which is simple in construction, convenient and dependable in operation, and which may be economically manufactured.

Other objects and advantages will appear from the following description, reference being had to the accompanying drawing, in which:

Fig. 1 is a central vertical sectional view of the tank reservoir, the discharge hose and nozzle being shown in elevation; and Fig. 2 is an enlarged vertical section of the two-way plug and fragmentary portions of the parts associated therewith.

The apparatus comprises a tank or reservoir 10 having convex heads 12 and 14, preferably welded thereto. A two-way plug 16 is threaded in a flange 18 formed integrally with or welded to the head 12, and has two separate passageways 20 and 22 formed therein. A pair of open-ended tubes 24 and 26, preferably welded together for mutual support at 28, are pressed into the lower ends of the passageways 20 and 22, respectively. The tube 24 has a comparatively small aperture 28 in the upper end thereof and the tube 26 has a larger aperture 30 similarly located therein. Air under pressure is supplied to the passageway 20 from an air hose 32, which terminates in a union 34 threaded in the plug 16. The union 34 has a spring pressed ball check valve 36 seated therein to prevent return flow of air. An air pressure gauge 38 is threaded in the upper end of the plug 16 and communicates with the passageway 20. The passageway 22 communicates with a flexible conduit 40, one end of which is suitably secured to the plug 16 and the other end of which carries a manually operable valve 42 which may be of conventional construction. A shut-off cock 44 is connected to the valve 42 and has a suitable spray nozzle 46 connected thereto.

Pressure in the tank 10 may be relieved by unscrewing a vent valve 48 threaded in a filling plug 50, the latter being threaded in a suitable boss 52 welded to the head 12.

The lubricant which is to be sprayed by the above-described apparatus is usually a composition of a light oil and graphite which is preferably agitated prior to use so as to cause the graphite particles to be suspended in the oil. This agitation is accomplished by the flow of air which is supplied under pressure through the conduit 32, past the check valve 36, and downwardly in the tube 24 to the central portion of the dished head 14. The bubbling of this air through the lubricant agitates it sufficiently to cause complete mixture of the graphite and oil in the event that the apparatus has not been used for some time and some of the graphite has settled.

Due to the fact that the flange 52 projects downwardly into the tank a short distance, the tank will be filled to a level a short distance below the apertures 28 and 30.

When using the device the cock 44 is open and the valve 42 manually operated to permit flow of air and lubricant through the conduit 40. When the pressure is then relieved by opening the valve 42, lubricant will flow upwardly through the tube 26 due to the pressure within the container 10 and at the same time air will flow into the upper end of the tube 26 through the aperture 30. The lubricant will thus be conveyed with the air through the conduit 40 to the nozzle 46, where the oil will be atomized and sprayed against the part to be lubricated.

Occasionally particles of foreign matter become lodged between the check valve 36 and its seat. This is especially true in winter when small particles of ice are sometimes present and carried along with the compressed air. The fact that the check valve is thus prevented from seating properly is of no particular importance if the air pressure is maintained in the hose 32 but, in the event that the hose 32 should be disconnected from the source of air pressure as when the apparatus is moved from one greasing pit to another, the contents of the tank, being under pressure, would be forced upwardly through the tube 24 and outwardly through the hose 32 if the aperture 28 were not provided in the tube 24. The aperture 28 is of sufficient size so that it will permit passage of air from the upper end of the tank at a rate sufficient to maintain the inside of the tube 24 and passageway 20 at substantially the same pressure as the interior of the tank 10, when the valve 36 is prevented from seating properly, and permits return flow in the hose 32. The aperture 28 is not, however, sufficiently large materially to decrease the amount of air which is forced through the tube 24 to cause agitation of the lubricant in the tank.

Aperture 28 thus serves the purpose of preventing inadvertent flow of lubricant from the tank through the hose 32 when the check valve 36 fails to seat properly but does not interfere to an appreciable extent with the normal operation of the apparatus.

The gauge 38 is provided to indicate to the operator whether or not the pressure in the tank is adequate, and also to remind the operator that the tank is under pressure when it is to be filled. When the tank is to be refilled with lubricant the compressed air is shut off and pressure within the tank 10 released by unscrewing the vent valve 48. Thereafter the plug 50 may be removed to permit filling of the tank.

The invention is capable of wide variation within equivalent limits and I contemplate such variation as may be desirable or useful in the particular adaptation of the invention shown, or in its adaptation to other apparatus. I do not restrict myself in any unessential particulars, but what I claim and desire to secure by Letters Patent is:

1. In a lubricant spraying apparatus, the combination of a lubricant reservoir, an inlet and a discharge tube depending into said reservoir and terminating adjacent the lower end thereof, a valved pressure fluid connection in communication with the upper end of said inlet tube, a valved discharge nozzle communicating with the upper end of said discharge tube, and apertures formed in each of said tubes at a point adjacent the upper ends thereof, the aperture in said inlet tube being small relative to the aperture in said tube.

2. In a lubricant spraying apparatus, the combination of a lubricant tank, an air inlet tube and an air and lubricant outlet tube depending into said tank and terminating near the bottom thereof, a valved pressure fluid connection in communication with the upper end of said inlet tube, a discharge nozzle connected to the upper end of said outlet tube, a manually operable valve between said outlet tube and nozzle, and apertures formed in each of said tubes at a point adjacent the upper ends thereof, the apertures in said inlet tube being smaller than the aperture in said outlet tube.

In witness whereof, I hereunto subscribe my name this 14th day of November, 1929.

ERNEST W. DAVIS.